(12) United States Patent
Morin-Drouin et al.

(10) Patent No.: US 9,880,359 B2
(45) Date of Patent: Jan. 30, 2018

(54) ADAPTER TIP AND MICROSCOPE SYSTEM FOR INSPECTION OF FIBER-OPTIC CONNECTOR ENDFACE

(71) Applicant: EXFO Inc., Quebec (CA)

(72) Inventors: Etienne Morin-Drouin, Quebec (CA); Robert Baribault, Quebec (CA)

(73) Assignee: EXFO INC., Quebec (CA)

( * ) Notice: Subject to any disclaimer, the term of this patent is extended or adjusted under 35 U.S.C. 154(b) by 0 days.

(21) Appl. No.: 15/160,398

(22) Filed: May 20, 2016

(65) Prior Publication Data

US 2016/0341904 A1 Nov. 24, 2016

Related U.S. Application Data

(60) Provisional application No. 62/164,868, filed on May 21, 2015, provisional application No. 62/188,552, filed on Jul. 3, 2015, provisional application No. 62/248,727, filed on Oct. 30, 2015.

(51) Int. Cl.

| | |
|---|---|
| *G01N 21/00* | (2006.01) |
| *G02B 6/36* | (2006.01) |
| *G01M 11/00* | (2006.01) |
| *G02B 6/38* | (2006.01) |
| *F21V 8/00* | (2006.01) |

(52) U.S. Cl.
CPC ........... *G02B 6/3628* (2013.01); *G01M 11/31* (2013.01); *G02B 6/0006* (2013.01); *G02B 6/385* (2013.01)

(58) Field of Classification Search
CPC ........... G01M 11/3145; G01M 11/335; G01M 11/33; G01M 11/3109; G01M 11/338
USPC ......................................................... 356/73.1
See application file for complete search history.

(56) References Cited

U.S. PATENT DOCUMENTS

| | | | |
|---|---|---|---|
| 6,215,924 B1 * | 4/2001 | Hulse ................... | G02B 6/2937 385/34 |
| 7,356,236 B1 * | 4/2008 | Huang .................. | G02B 6/3807 385/134 |
| 8,164,744 B2 | 4/2012 | Narum et al. | |
| 8,976,345 B2 | 3/2015 | Zhou et al. | |
| 2014/0327735 A1 * | 11/2014 | Ruchet ................... | G02B 6/385 348/40 |
| 2014/0354977 A1 | 12/2014 | Zhou et al. | |

FOREIGN PATENT DOCUMENTS

WO 2013097041 A1 7/2013

\* cited by examiner

*Primary Examiner* — Tarifur Chowdhury
*Assistant Examiner* — Md M Rahman
(74) *Attorney, Agent, or Firm* — Erise IP, P.A.

(57) ABSTRACT

There is provided an adapter tip to be employed with an optical-fiber inspection microscope probe and an optical-fiber inspection microscope system suitable for imaging the optical-fiber endface of an angled-polished optical-fiber connector deeply recessed within a connector adapter. The adapter tip or microscope system comprises a relay lens system having at least a first relay lens which is disposed so as to directly receive light reflected from the optical-fiber endface during inspection, the lens axis of the first relay lens being offset relative to the optical-fiber endface so as to deviate light reflected from the optical-fiber endface towards the optical-fiber axis of the connector.

20 Claims, 9 Drawing Sheets

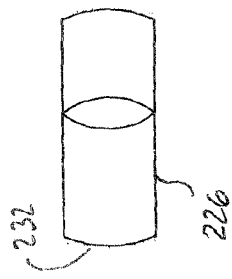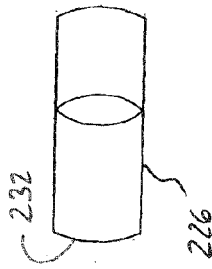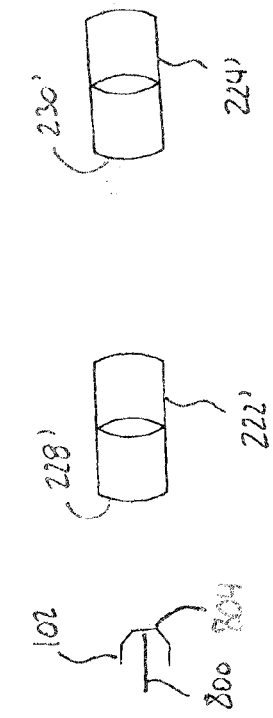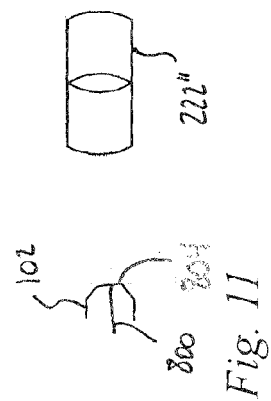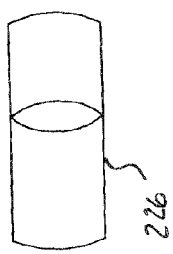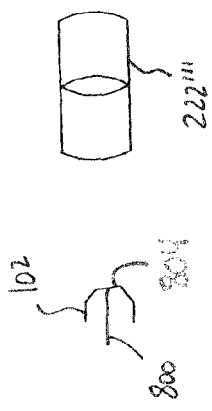
Fig. 10  Fig. 11  Fig. 12

ADAPTER TIP AND MICROSCOPE SYSTEM FOR INSPECTION OF FIBER-OPTIC CONNECTOR ENDFACE

TECHNICAL FIELD

The invention generally relates to the inspection of optical-fiber connector endfaces and, more specifically, to adapter tips, to be used in conjunction with an optical-fiber inspection microscope probe, and suitable for imaging angled-polished optical-fiber connectors.

BACKGROUND OF THE ART

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber inspection microscopes are commonly employed to visually inspect and/or to analyze the optical-fiber endface of an optical-fiber connector at installation or during maintenance of optical communication networks, in order to verify the quality of the optical-fiber connection.

Because of the wide variety of optical-fiber connector types deployed in the telecommunication industry, optical-fiber inspection microscope probes are typically employed with interchangeable adapter tips so as to allow inspection of various types of optical-fiber connectors directly or as inserted in an optical-fiber connector adapter.

In order to appropriately image the optical-fiber endface, illumination light reflected from the endface should be appropriately captured by the inspection microscope. This typically necessitates that the imaging axis of the inspection microscope system be aligned perpendicularly to the inspected endface. However, this alignment can become impractical when inspecting an angled-polished physical-contact (APC) optical-fiber endface that is deeply recessed within a long and narrow optical-fiber connector adapter. An example of such a recessed endface is that of a E2000/APC connector and its corresponding connector adapter as shown in FIG. 1, as defined by international Standard associations (see IEC 61754-15:2009/COR1:2014 and TIA-604-16).

Some fiber inspection adapter tips exist in the art for imaging deeply recessed APC connector endfaces. For example, U.S. Pat. No. 8,976,345 to ZHOU et al. describes a fiber inspection adapter tip using a lens or lens system within the tip. The tip lens or lens system is tilted relative to the inspected angled-polished optical-fiber endface, i.e., the lens axis is not normal to the optical-fiber endface). The fiber inspection microscope probe is also tilted relative to both the tip lens or lens system and the optical-fiber endface.

Although there exist fiber inspection adapter tips in the art adapted to image deeply recessed APC connector endfaces, there is still room for alternative solutions and improvements.

SUMMARY

There is provided an adapter tip to be employed with an optical-fiber inspection microscope probe and an optical-fiber inspection microscope system suitable for imaging and/or analyzing the optical-fiber endface of an angled-polished optical-fiber connector deeply recessed within a connector adapter. Because of the angle formed between the normal of the optical-fiber endface and the optical-fiber axis of the connector (which coincides with the central axis of the connector ferrule), the object plane to be imaged is oriented at an angle (of 8 degrees in the case of APC connectors in the industry) relative to the central axis of the narrow channel formed within the connector adapter. The adapter tip or microscope system comprises a relay lens system which function is to deviate light coming from the optical-fiber endface through reflection of the illumination light (mostly specular but also potentially diffuse)—referred to hereinafter as the object beam—towards the optical-fiber axis of the connector, in order to allow it to exit the connector adapter and be captured by the optical-fiber inspection microscope probe. This light deviation is obtained by offsetting the lens axis of each relay lens in the relay lens system so that the lens axis of each relay lens is not aligned with the optical-fiber endface of the connector.

The relay lens system prevents a substantial proportion of the object beam to be obstructed by the inside walls of the connector adapter and therefore allows a substantial portion of the object beam reflected from the optical-fiber endface to exit the connector adapter and be captured by the inspection microscope probe.

The relay lens system also allows the optical-fiber inspection microscope probe to be mostly aligned and parallel with the inspected optical-fiber connector. When performing optical-fiber connector inspection on high density patchpanel for example, this alignment minimizes interference of the optical-fiber inspection microscope probe with neighboring optical-fiber connectors.

The offset may also allow to reproduce the object on an intermediate image plane tilted relative to the real object plane that is on the connector endface, so as to reduce the angle between the normal of the intermediate image plane and the optical-fiber axis of the connector (i.e. the angle between the normal of the intermediate image plane and the optical-fiber axis of the connector is smaller than that between the optical-fiber endface and the optical-fiber axis of the connector).

In accordance with one embodiment, optical axes of the relay lens(es) of the relay lens system and that of inspection microscope probe are all parallel to the optical-fiber axis of the connector, which makes it easier, and thus less expensive, to manufacture the adapter tip within required mechanical tolerances.

There is provided an adapter tip to be employed with an optical-fiber inspection microscope probe and an optical-fiber inspection microscope system suitable for imaging the optical-fiber endface of an angled-polished optical-fiber connector deeply recessed within a connector adapter. The adapter tip or microscope system comprises a relay lens system having at least a first relay lens which is disposed so as to directly receive light reflected from the optical-fiber endface during inspection, the lens axis of the first relay lens being offset relative to the optical-fiber endface so as to deviate light reflected from the optical-fiber endface and produce an intermediate image plane that is tilted towards the optical-fiber axis of the connector.

One aspect of the invention provides an adapter tip to be employed with an optical-fiber inspection microscope probe for imaging an optical-fiber endface of an angled-polished optical-fiber connector recessed within a connector adapter. The adapter tip comprises:
- a housing having a mating interface configured to mechanically engage with the connector adapter for inspecting the optical-fiber endface within the connector adapter; and a relay lens system disposed in said housing and having at least a first relay lens which is disposed so as to directly receive light reflected from said optical-fiber endface during inspection, the lens axis of said first relay lens being offset relative to the optical-fiber endface so as to deviate light reflected from the optical-fiber endface towards the optical-fiber axis of the connector.

Another aspect of the invention provides an optical-fiber inspection microscope system for imaging an optical-fiber endface of an angled-polished optical-fiber connector recessed in a channel. The microscope system comprises:

an optical-fiber inspection microscope probe; and
an adapter tip connectable to the optical-fiber inspection microscope probe and comprising:
  a housing having a mating interface configured to mechanically engage with the connector adapter for inspecting the optical-fiber endface within the connector adapter;
  a relay lens system disposed in said housing and having at least a first relay lens which is disposed so as to directly receive light reflected from said optical-fiber endface during inspection, the lens axis of said first relay lens being offset relative to the optical-fiber endface so as to deviate light reflected from the optical-fiber endface towards the optical-fiber axis of the connector.

In this specification, unless otherwise mentioned, word modifiers such as "substantially" and "about" which modify a condition or relationship characteristic of a feature or features of an embodiment, should be understood to mean that the condition or characteristic is defined to within tolerances that are acceptable for proper operation of that embodiment in the context of an application for which it is intended.

Similarly, unless otherwise mentioned, word modifiers such as "appropriately" which modify a functional characteristic of a feature or features of an embodiment, should be understood to mean that the function is accomplished to an extent that is acceptable for proper operation of that embodiment in the context of an application for which it is intended.

BRIEF DESCRIPTION OF THE DRAWINGS

Further features and exemplary advantages of the present invention will become apparent to the skilled person from the following detailed description, taken in conjunction with the appended drawings, in which:

FIG. 10 is a schematic illustrating an optical configuration of an adapter tip in accordance with another embodiment wherein the lens axis of each relay lens is not parallel to the optical-fiber axis of the optical-fiber connector and wherein the lens axis of the objective lens is not parallel to the optical-fiber axis of the optical-fiber connector;

FIG. 11 is a schematic illustrating an optical configuration of an adapter tip in accordance with yet another embodiment wherein the lens axis of each relay lens is parallel to the optical-fiber axis of the optical-fiber connector but wherein the lens axis of the objective lens is not parallel to the optical-fiber axis of the optical-fiber connector;

FIG. 12 is a schematic illustrating an optical configuration of an adapter tip in accordance with still another embodiment where a single relay lens has its lens axis parallel to the optical-fiber axis of the optical-fiber connector, wherein the lens axis of the objective lens is also parallel to the optical-fiber axis of the optical-fiber connector;

It will be noted that throughout the appended drawings, like features are identified by like reference numerals.

It should also be understood that when the appended drawings are denoted as schematics, elements of the drawings are not necessarily drawn to scale. On all figures, mechanical or other physical components may also be omitted in order to not unduly encumber the figures.

DETAILED DESCRIPTION

Figure 1:
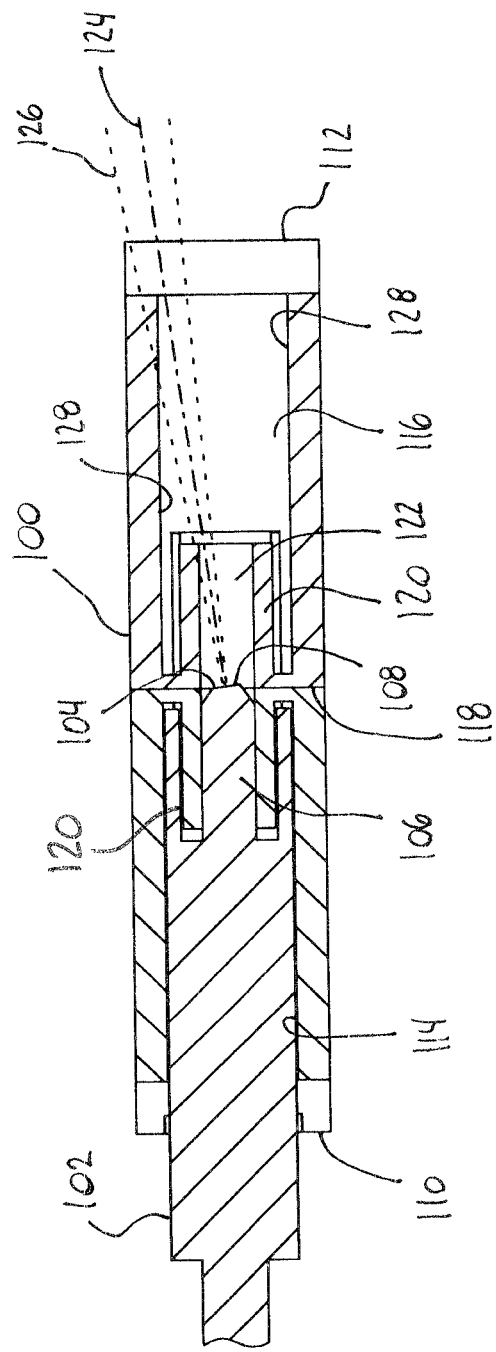
FIG. 1 (PRIOR ART) is a cross-sectional view of angled-polish optical-fiber connector inserted in an optical-fiber connector adapter.
Figure 2:
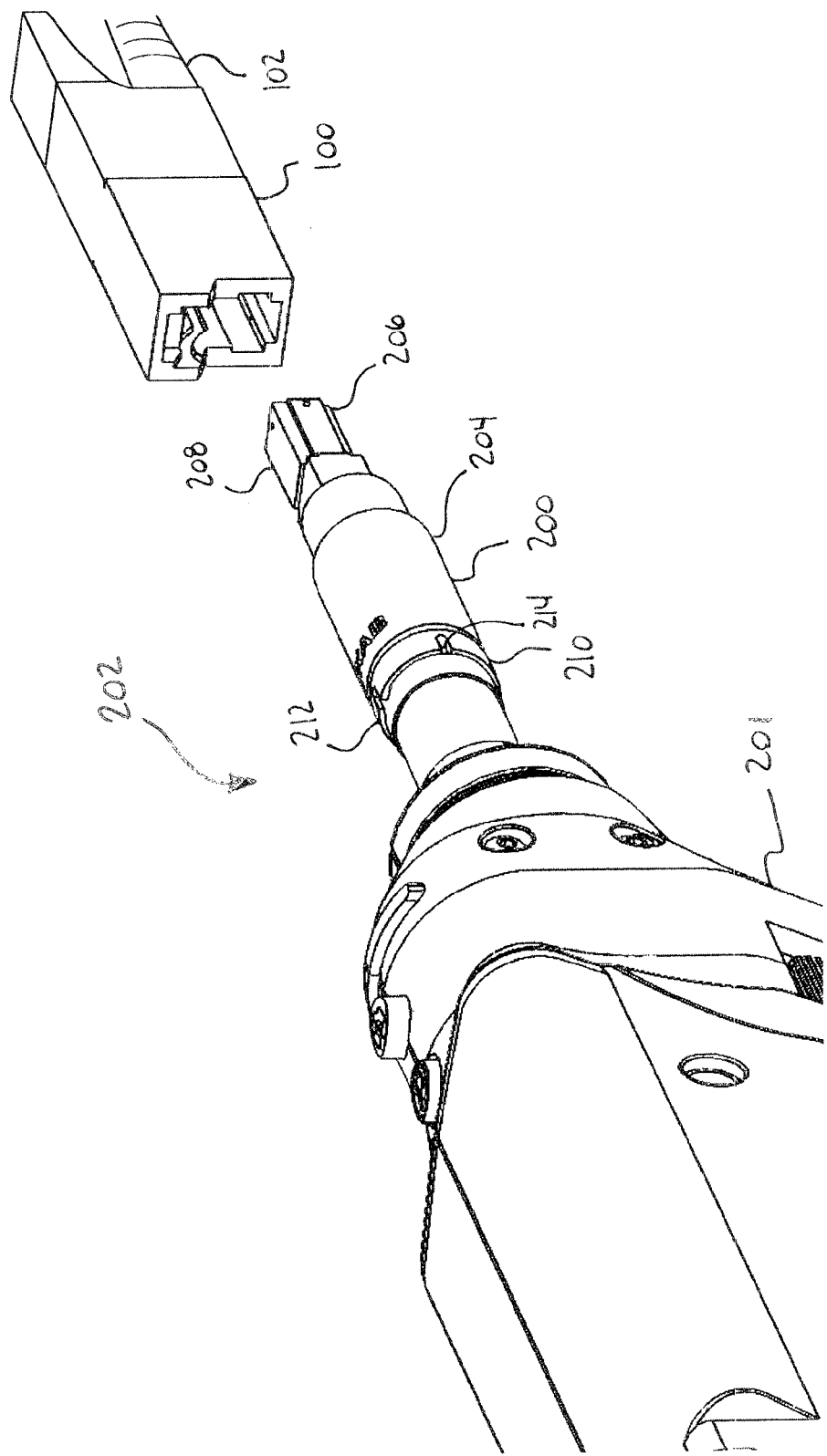
FIG. 2 is a back-perspective view of an optical-fiber inspection microscope probe coupled to an adapter tip for imaging an optical-fiber endface of an angled-polished optical-fiber connector recessed within a connector adapter, in accordance with one embodiment.
Figure 3:
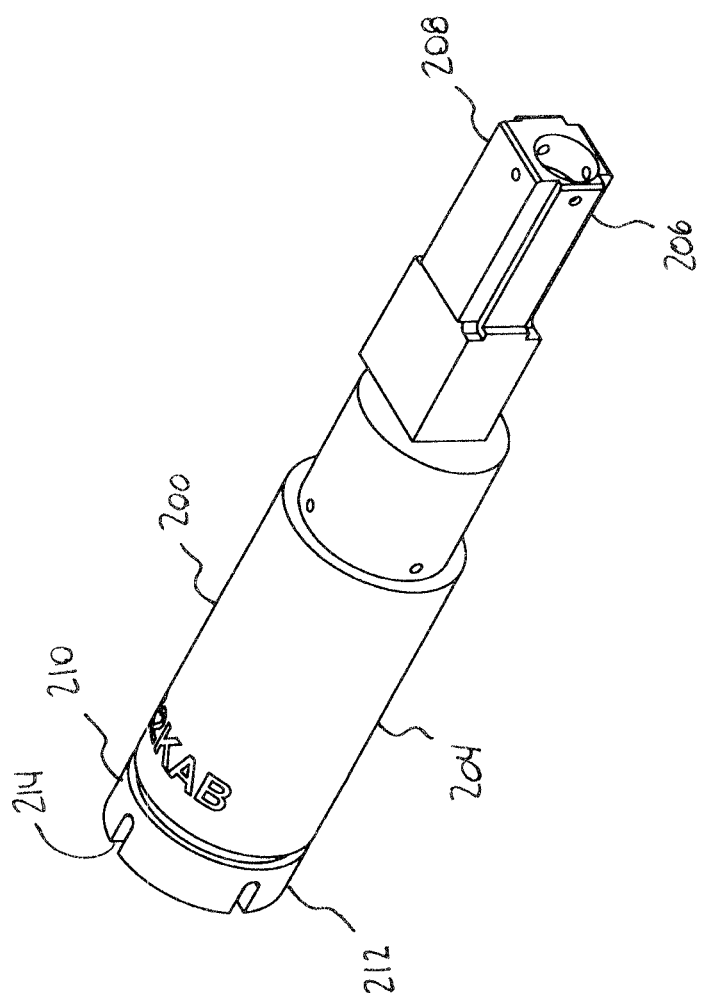
FIG. 3 is a front-left isometric view of an adapter tip in accordance with one embodiment.
Figure 4:
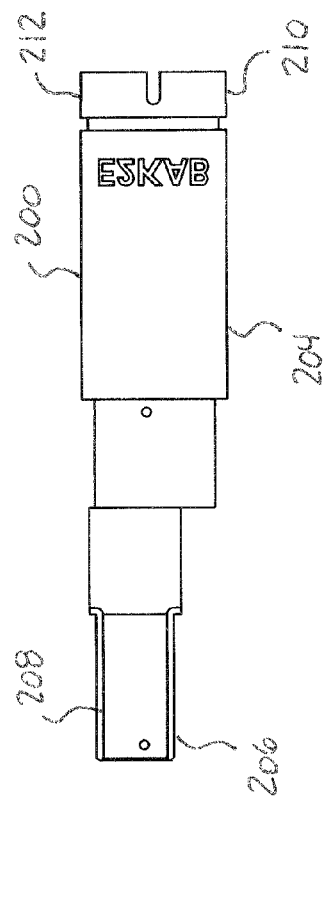
FIG. 4 is a top plan view of the adapter tip of FIG. 3.
Figure 5:
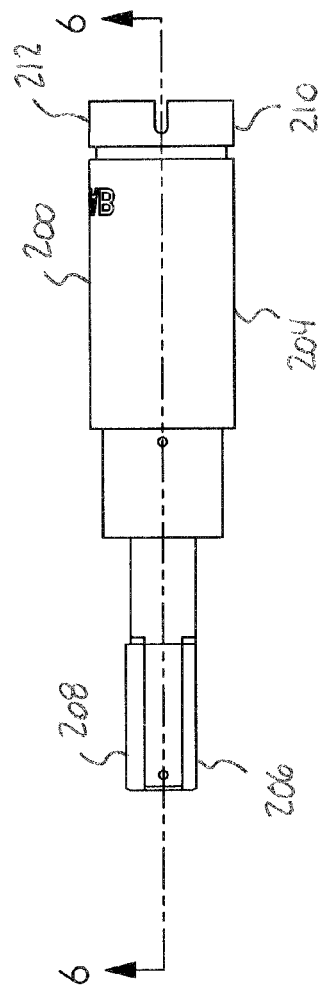
FIG. 5 is a right-side elevation view of the adapter tip of FIG. 3.
Figure 6:
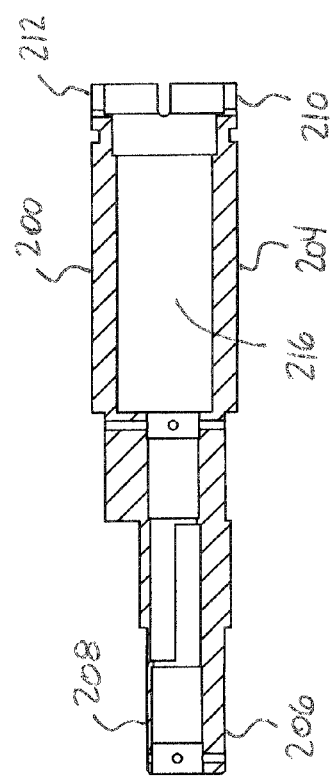
FIG. 6 is a cross-sectional view of the housing-only of adapter tip of FIG. 3 taken along line 6-6 of FIG. 5.

Now referring to the drawings, FIG. 1 shows a cross-sectional view of a connector adapter 100 suitable for interconnecting optical-fiber connectors known in the industry as E2000/APC connectors. It should be noted that FIG. 1 is simplified such that some elements (notably of the optical-fiber connector) may be omitted in order to emphasize the parts that are relevant to the present description. In some applications, optical-fiber connectors to be inspected using an optical-fiber inspection microscope probe are inserted in a connector adapter such as that of connector adapter 100. As known in the art, connector adapters are used to interconnect two optical fibers terminated by optical-fiber connectors such as connector 102. In order that the endfaces 104 of the optical fibers may be brought into close contact, optical-fiber connectors employ fiber-optic ferrules 106 in which the terminated portion of an optical fiber is inserted. The fiber-optic ferrule 106 and optical fiber assembly is polished at the termination, either perpendicularly to the optical fiber axis or at an 8-degree angle in the case of Angled-polished Physical Contact (APC) connectors, so as to form a ferrule endface 108 enclosing, usually in its center, the optical-fiber endface 104. The connector adapter 100 defines two opposing ends 110, 112 opening to respective connector-receiving channels 114, 116 reaching at a connector interface 118 in the center of the connector adapter 100. It incorporates a mating sleeve 120 defining a ferrule receiving channel 122 in continuity and properly aligned with both connector-receiving channels 114, 116. Two optical-fiber connectors can be interconnected by inserting a first connector via the first end 110 into connector-receiving channel 114 and a second connector (not shown) via the second end 112 into connector-receiving channel 116. In the case of E2000/APC connectors and adapters, angular alignment of the optical-fiber connectors is provided by the somewhat rectangular shape of the connector-receiving channels 114, 116 that is generally asymmetric so that the connectors can only be received in predetermined orientation. When the connectors are properly inserted, their respective ferrules 106 tightly fit in opposing ends of the mating sleeve 120, which serves to finely align the ferrules 106 (a single ferrule being actually shown in FIG. 1) so that the terminated optical fibers are aligned and in physical contact.

When inspecting the optical-fiber endface 104 of a connector 102 inserted in a connector adapter 100, the connector 102 to be inspected is generally inserted in the connector adapter 100 via one end 110 and through a connector-receiving channel 114 such that the surface of the optical-fiber endface 104 to be imaged lies at the connector interface 118 recessed within the connector adapter 100. Imaging is therefore performed through the other end 112, i.e. the open one, and the other connector-receiving channel 116. As known in the art, in order to properly image the optical-fiber endface 104, the object beam 126 reflected from the endface (through reflection of the illumination light on the connector endface) should be appropriately captured by the inspection microscope objective lens. This typically necessitates that the imaging and illumination axis of the inspection microscope system be aligned perpendicularly to the inspected optical-fiber endface 104. As can be seen in FIG. 1 in which the normal 124 to the angled-polished optical-fiber endface is illustrated, this can become mechanically impractical when inspecting an angled-polished optical-fiber endface 104 that is deeply recessed within long and narrow optical-fiber connector adapter such as that of E2000/APC connector adapter 100. Furthermore, as can be seen in FIG. 1, a substantial proportion of the object beam 126 is obstructed by the inside walls 128 defined by the connector-receiving channel 116, preventing it from being captured by an optical-fiber inspection microscope probe that would be disposed at open end 112. Hence, the numerical aperture and illumination quality achievable by conventional means is limited.

Now referring to FIGS. 2-7, there is provided an adapter tip 200 to be employed with an optical-fiber inspection microscope probe 201 suitable for imaging the optical-fiber endface 104 of an angled-polished optical-fiber connector 102, deeply recessed within a connector adapter 100. The optical-fiber inspection microscope probe 201 is a generic optical-fiber inspection microscope probe 201 adapted to be employed with a variety of interchangeable adapter tips so as to allow inspection of various types of optical-fiber connectors directly or as inserted in an optical-fiber connector adapter. The adapter tip 200 and the optical-fiber inspection microscope probe 201 together form an optical-fiber inspection microscope system 202.

The most common adapter tips employed for inspecting, e.g., FC/PC or FC/APC connectors are mostly mechanical adapters and therefore do not include any optical elements. Hence, the input lens of the optical-fiber inspection microscope probe 201 is referred to herein as the "objective lens" (see 226 in FIG. 8).

The illustrated embodiment of an adapter tip is suitable for use with a commercially-available optical-fiber inspection probe 201 and is designed to interface the probe 201 with E2000/APC connectors inserted in a corresponding connector adapter 100. Although the adapter tip 200 is configured to interface with E2000/APC connectors, it should be understood that its mechanical and optical elements may be modified to interface with other types of optical-fiber connectors and connector adapters in which the optical-fiber endface to be imaged is recessed. It can also be used to produce long adapter tips configured to facilitate access of optical-fiber connectors in dense patch-panels. Examples of other connectors and connector adapters presenting a recessed angled optical-fiber endface are LC-APC connectors and SC-APC connectors inserted in their respective connector adapters.

The adapter tip 200 comprises a housing 204 having a mating interface 206 on its proximal end 208 configured to mechanically engage with the connector adapter 100 and a connection mechanism 210 on its distal end 212 to releasably attach to an optical-fiber inspection microscope probe 201. The housing 204 defines a light-relaying channel 216 between its proximal end 208 and its distal end 212 to relay the object beam from the optical-fiber endface 104 to the objective lens (see FIG. 8) of the inspection microscope probe 201. It this embodiment, the housing 204 is made of a single integral piece of machined stainless steel but mechanically assemblies may alternatively be envisaged.

The mating interface 206 has outer dimensions that are substantially complementary to inner dimensions of a connector-receiving channel 116 (see FIG. 1) of the connector adapter 100 so that it easily inserts into the connector adapter 100 in close proximity with the optical-fiber endface 104 to be inspected. Alignment of adapter tip 200 to the optical-fiber connector 102 is achieved by the small mechanical play of the mating interface 206 within the connector adapter 100.

In one embodiment, the connection mechanism 210 is a screw-threaded mechanism including threads (not shown) on the external surface of the adapter tip 100. The inspection microscope probe 201 has a corresponding connection mechanism (not shown) comprising a swiveled threaded ring. One or more notches 214 are provided on the connection mechanism 210 which are to be received in corresponding keys (not shown) on the corresponding connection mechanism of the optical-fiber inspection microscope probe 201 to angularly lock the adapter tip 200 in place. It is noted that these notches 214 and keys are optional but ease the manipulations necessary to connect the adapter tip 200 to the inspection microscope probe 201. The adapter tip 200 is attached to the inspection microscope probe 201 by screwing the threaded ring on the threads of the connection mechanism 210. Of course, other solid and releasable connection mechanisms such as a bayonet connector for example may be used instead.

Figure 7:
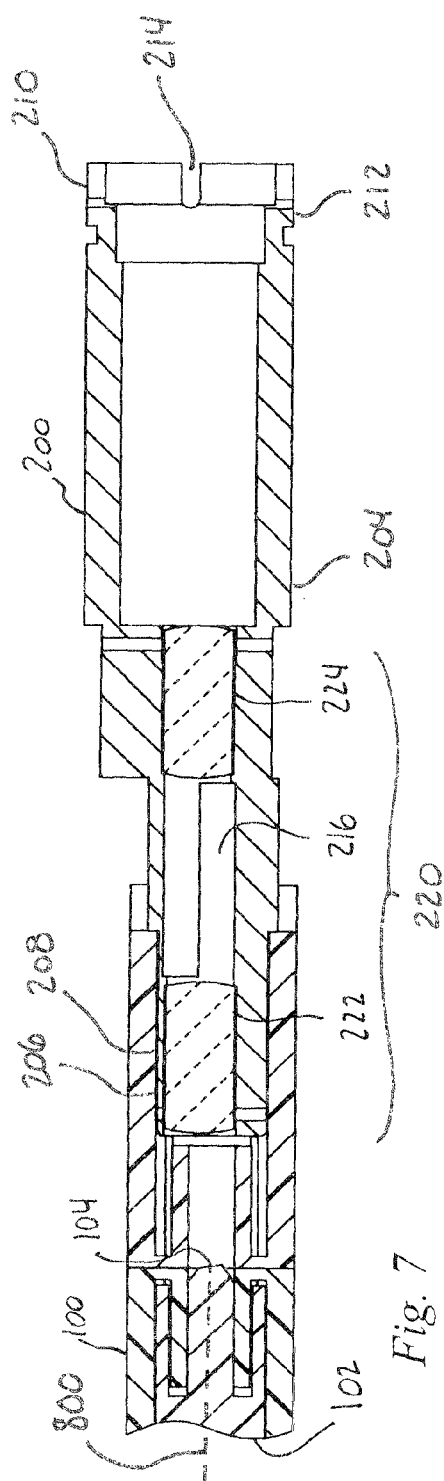
FIG. 7 is a cross-sectional view of the adapter tip of FIG. 7 shown as inserted within a connector adapter for imaging an optical-fiber endface of an angled-polished optical-fiber connector recessed within the connector adapter.

As shown in FIG. 7, the adapter tip 200 comprises a relay lens system 220 disposed within the light relaying channel 216 defined in the housing 204. The relay lens system 220 comprises a first relay lens 222 and a second relay lens 224. Relay lens 222 is disposed at the proximal end 208 of the adapter tip 200 so as to be adjacent to the inspected optical-fiber endface 104 when the adapter tip 200 is inserted in a connector adapter 100, in order to directly receive the object beam reflected from the optical-fiber endface 104 (through reflection of the illumination light). Relay lens 222 is positioned as close as possible to the proximal end 208 of the adapter tip 200 so as to capture as much of the divergent object beam as possible. Relay lens 222 is therefore positioned within the connector adapter 100 when the mating interface 206 of the adapter tip 100 is inserted into the connector-receiving channel 116 (see FIG. 1) of the connector adapter 100. Relay lens 224 is disposed the light relaying channel 216, spaced apart from relay lens 222.

Figure 8:
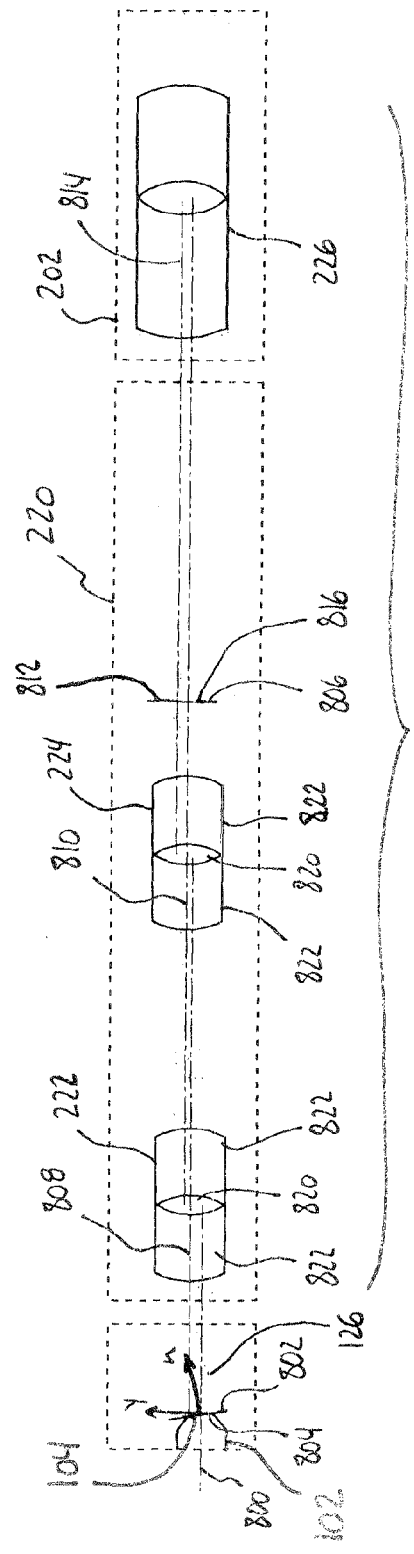
FIG. 8 is a schematic illustrating the relay lens system of the adapter tip of FIG. 3.

As best shown in FIG. 8, relay lens 222 and relay lens 224 cooperate to together deviate the object beam 126 towards the optical-fiber axis 800 of the connector 102 (see also FIG. 7) in order to allow it to exit the connector adapter 100 (see FIG. 7) and be captured by the objective lens 226 of the optical-fiber inspection microscope probe 201. Relay lens 222, relay lens 224 and the objective lens 226 defined an optical system 227. The object 804 to be imaged, i.e. the optical-fiber endface 104, lies in a real object plane 802, to within a focusing range of the optical-fiber inspection microscope probe 201. The relay lens system 220 reproduces the real object 804 that lies in the real object plane 802 on an intermediate image plane 806 that is tilted relative to the real object plane 802 toward a plane orthogonal to the optical-fiber axis 800, so as to reduce the angle between the normal of the intermediate image plane 802 and the optical-fiber axis 800 of the connector 102. In order to do so, the lens axis 808 of relay lens 222 is slightly offset relative to the optical-fiber endface 104 so that it is not aligned with and does not intersect the optical-fiber endface 104. It is slightly offset toward the direction corresponding to the rejection y of the normal n to the optical-fiber endface 104 on the optical-fiber axis 800. Similarly, the lens axis 810 of relay lens 224 is also slightly offset relative to the center of relay lens 222 so that it is not aligned therewith. There results an intermediate image 812 lying in the intermediate image plane 806 between relay lens 224 and the objective lens 226, and which is tilted relative to the real object 804 toward a plane orthogonal to the optical-fiber axis 800 and slightly offset along y relative to the real object 804. The objective lens 226 is disposed such that the intermediate image plane 806 lies on the original object plane 816 of the optical-fiber inspection microscope probe 201 (without the adapter tip 200) to within its focusing range. As such, the lens axis 814 of the objective lens 226 (also referred to herein as the imaging and illumination axis 814 of the optical-fiber inspection microscope probe 201) is also slightly offset along y relative to the center of relay lens 224.

In the embodiment of FIG. 8, the optical axes 808, 810 of both relay lenses 222, 224 are parallel to the optical-fiber axis 800, and therefore not normal to the inspected endface (there is an 8° angle between the normal n to the optical-fiber endface and the optical-fiber axis). The offsets reduce the amount of light blocked by the inside walls 128 (see FIG. 1) of the connector adapter 100, and also reduce the tilt of the intermediate image plane 806 created in front of the objective lens 226 relative to a plane orthogonal to the optical-fiber axis 800, by effectively rotating the intermediate image plane 806 relative to the real object plane 802. This tilt of the intermediate image plane 806 is reduced to a point where it can be neglected since the variation of focus across the image caused by the tilt remains below the diffraction limit of the imaging system of the optical-fiber inspection microscope system 202. Or said differently, assuming an objective lens 226 disposed in parallel with the optical-fiber axis 800, the variation of the distance of the intermediate image plane 806 to the objective lens 226, which is caused by the tilt, is smaller than the depths of field of the imaging system. The configuration described above allows placing the lenses such that their optical axes are all parallel (including the objective lens 226), which makes the adapter tip 200 much easier to manufacture with good precision in the relative orientations of the relay lenses 222, 224 and the objective lens 226.

As such, the normal n to the inspected optical-fiber endface 104, and hence of the real object plane 802, forms an 8° angle relative to the imaging and illumination axis 814 of the optical-fiber inspection microscope probe 201.

In the embodiment of FIG. 8, the relay lenses 222 and 224 are compound lenses in order to provide low distortion and good off-axis performance. For example, relay lenses 222 and 224 may each comprise an achromatic triplet lens made of a symmetric double convex lens element 820 cemented between two identical negative meniscus lens elements 822 having a refractive index higher than that of the convex lens element 820. The achromatic triplet lenses may be optimized for minimizing off-axis aberrations when employed with an infinite conjugate ratio, i.e. when focusing at infinity an object point placed at focal distance.

In one embodiment, relay lenses 222 and 224 each consist of a Hasting triplet lens. By design, Hasting triplet lenses are optimized for an infinite conjugate ratio. Relay lens 222 is then disposed such that its focal point lies nearly on the real object plane 802. Similarly, relay lens 224 is disposed relative to the objective lens 226 such that its focal point lies nearly on the original object plane 816 defined by the optical-fiber inspection microscope probe 201.

In one embodiment, relay lenses 222 and 224 are identical in design. In one embodiment, relay lenses 222 and 224 are identical Hasting triplet lenses each having an effective focal length of 8.875 mm and a diameter of 3.74 mm. Relay lens 222 is positioned in the adapter tip 200 so as to be disposed at the optical system's focal distance to the optical-fiber endface 104 during inspection. The distance between relay lenses 222 and 224 is 19.39 mm and relay lens 224 is positioned in the adapter tip 200 so as to be disposed at a distance of 32.35 mm to the objective lens 226 (the distances being defined along the imaging and illumination axis 814 of the optical-fiber inspection microscope probe 201, between the respective input surfaces of the lenses, i.e. the surfaces that are the closest to the object). The offset between the optical-fiber axis 800 and the lens axis 808 of relay lens 222 is 0.68 mm, the offset between the lens axis 808 of relay lens 222 and the lens axis 810 of relay lens 224 is 0.24 mm, and the offset between the lens axis 810 of relay lens 224 and the lens axis 814 of the objective lens 226 is 0.63 mm.

Of course, adjustments may be made from this configuration, e.g., to optimize the overall optical system 227 including the relay lenses 222, 224 and the objective lens 226.

Although the embodiments described with reference to FIGS. 2-8 advantageously employs two relay lenses 222, 224 that are identical in design, it will be understood that this is not necessary and that relay lenses 222 and 224 may alternatively be different. Also, in other embodiment, more or less than two relay lenses 222, 224 may be employed.

Figure 9:
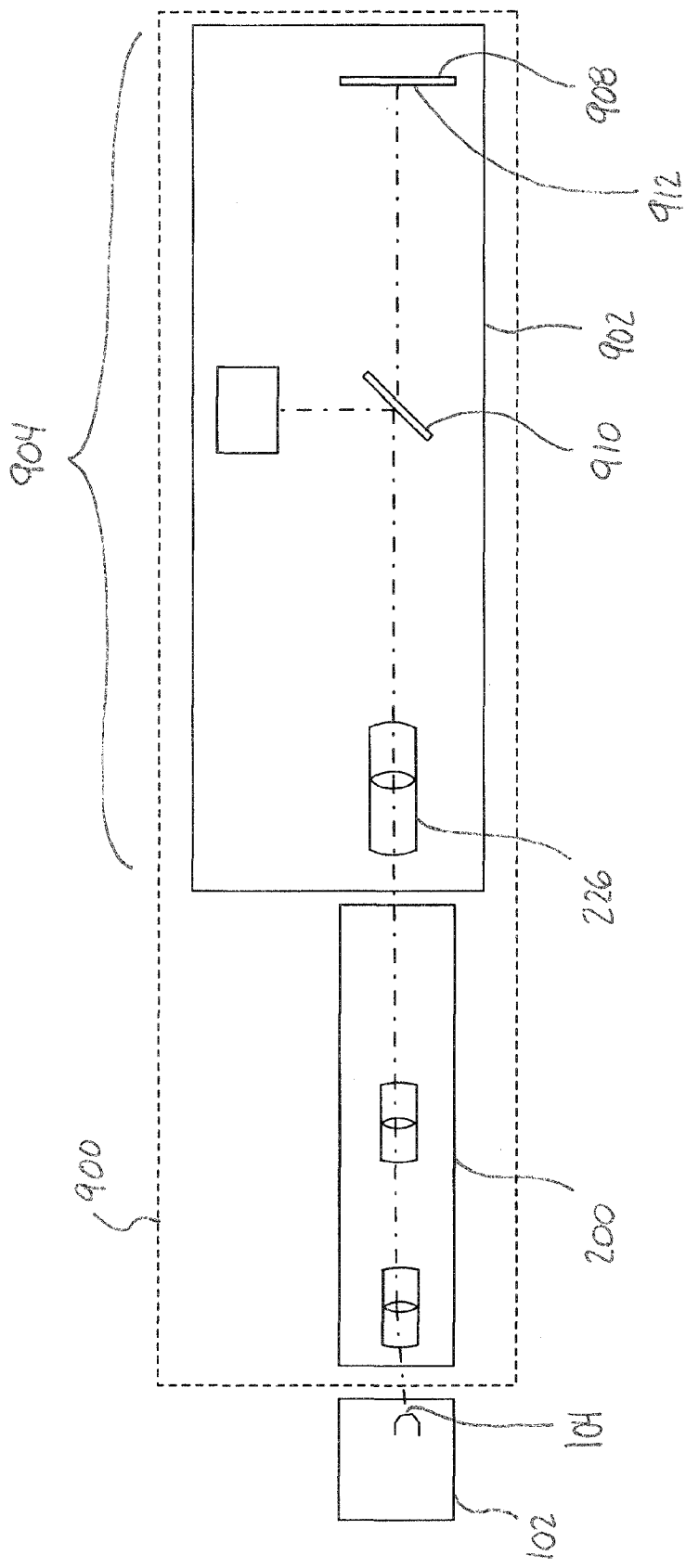
FIG. 9 is a block diagram illustrating an optical-fiber inspection microscope system comprising the adapter tip of FIG. 3, in accordance with one embodiment.

FIG. 9 illustrates an optical-fiber inspection microscope system 900 which employs the adapter tip 200 of FIGS. 2-8. The optical-fiber inspection microscope system 900 comprises a combination of an optical-fiber inspection microscope probe 902 and the adapter tip 200. As known in the art, the optical-fiber inspection microscope probe 902 at least contains an optical-fiber endface imaging assembly 904 comprising an illumination source 906, an objective lens 226, an image sensor 908 and a beam splitter 910. The illumination source 906 illuminates the optical-fiber endface 104 and can be embodied in a light-emitting diode (LED) typically emitting in the blue wavelength region. The objective lens 226 directs the illumination light on the optical-fiber endface 104 to be imaged and captures light returned from the optical-fiber endface 104 through reflection of the illumination light in order to image the optical-fiber endface 104 on the image sensor 908 positioned on an image plane 912. The image sensor 908 may be embodied in a complementary metal-oxide-semiconductor (CMOS) sensor or a charge-coupled device (CCD), for instance. The beam splitter 910, e.g. a 50/50 beam splitter, is located between the objective lens 226 and the image sensor 908. It both directs the illumination light toward the objective lens 226 for illuminating the optical-fiber endface 104 and propagates the returned object beam 126 from the objective lens 226 to the image sensor 908.

It will be understood that other components may be included in the optical-fiber inspection microscope probe 902 such as, for example, a power detection assembly (not shown) for measuring an optical power of light exiting the optical-fiber connector 102 at the optical-fiber endface 104, or any aberration compensation optical element(s).

It should be appreciated that although in the configuration of FIGS. 2-8 the lens axis of each relay lenses 222, 224 and that of the objective lens 226 are advantageously all parallel to the optical-fiber axis 800 of the optical-fiber connector 102, other optical configurations in which some or all optical axes are not parallel may offer at least equivalent optical performance with a small practical drawback on ease of manufacturing.

As such, FIG. 10 shows an optical configuration in accordance with another embodiment wherein respective optical axes of relay lenses 222', 224' are not parallel to the optical-fiber axis 800 of the optical-fiber connector 102 and wherein the lens axis of the objective lens 226 is also not parallel to the optical-fiber axis 800.

In this embodiment, relay lenses 222' and 224' are identical Hasting triplet lenses each having an effective focal length of 8.88 mm and a diameter of 3.74 mm. The angle between the lens axis of relay lens 222' and the normal n to the optical-fiber endface 104 is 6.45 degrees, the angle between the lens axis of relay lens 224 and the normal n to the optical-fiber endface 104 is 4.67 degrees, and the angle between the lens axis of objective lens 226 and the normal n to the optical-fiber endface 104 is 7.54 degrees. Relay lens 222' is positioned in the adapter tip 200 so as to be disposed at the optical system's focal distance to the optical-fiber endface 104 during inspection. The distance between relay lenses 222' and 224' is 19.39 mm and relay lens 224' is positioned in the adapter tip 200 so as to be disposed at a distance of 32.29 mm to the objective lens 226 (the distances being defined along the imaging and illumination axis 814 of the optical-fiber inspection microscope probe 201, between the respective input surfaces of the lenses). The offset between the center of the input surface 228' of relay lens 222' and that of the optical-fiber endface 104 is 0.68 mm, the offset between the center of the input surface 230' of relay lens 224' and that of the input surface 228' of relay lens 222' is 0.26 mm, and the offset between the center of the input surface 232 of the objective lens 226 and that of the input surface 230' of relay lens 224' is 0.94 mm.

It will be understood that the adapter tip 200 may readily be adapted to implement the optical configuration of FIG. 10.

FIG. 11 shows an optical configuration in accordance with yet another embodiment wherein respective optical axes of relay lenses 222", 224" are parallel to the optical-fiber axis 800 of the optical-fiber connector 102 but wherein the lens axis of the objective lens 226 is not parallel to the optical-fiber axis 800.

In this embodiment, relay lenses 222" and 224" are identical Hasting triplet lenses each having an effective focal length of 8.876 mm and a diameter of 3.74 mm. The angle between the lens axis of objective lens 226 and the normal n to the optical-fiber endface 104 is 9.1 degrees. Relay lens 222" is positioned in the adapter tip 200 so as to be disposed at the optical system's focal distance to the optical-fiber endface 104 during inspection. The distance between relay lenses 222" and 224" is 19.39 mm and relay lens 224" is positioned in the adapter tip 200 so as to be disposed at a distance of 32.35 mm to the objective lens 226. The offset between the lens axis of relay lens 222" and the optical-fiber axis 800 is 0.64 mm, the offset between the lens axis of relay lens 224" and the optical-fiber axis 800 is 0.07 mm, and the offset between the center of the input surface 232 of the objective lens 226 and that of relay lens 224" is 0.24 mm.

Of course, the adapter tip 200 may readily be adapted to implement the optical configuration of FIG. 11.

FIG. 12 shows an optical configuration in accordance with still another embodiment that consists of a single relay lens 222'" having its lens axis parallel to the optical-fiber axis 800 of the optical-fiber connector 102. In this embodiment, the lens axis of the objective lens 226 is also parallel to the optical-fiber axis 800.

In this embodiment, relay lenses 222'" consists of a Hasting triplet lens. Relay lens 222'" is positioned in the adapter tip 200 so as to be disposed at the optical system's focal distance to the optical-fiber endface 104 during inspection. Relay lens 222'" is positioned in the adapter tip 200 so as to be disposed at a distance of 32.35 mm to the objective lens 226. The offset between the lens axis of relay lens 222'" and the optical-fiber axis 800 and the offset between the lens axis of the objective lens 226 and that of relay lens 222'" may be optimized to minimize aberrations in the image of the optical-fiber endface 104 on the image sensor 908.

Of course, the adapter tip 200 may readily be adapted to accommodate a single relay lens as in the optical configuration of FIG. 12.

As in the optical configuration of the adapter tip 200 of FIGS. 2-8, that of FIGS. 10, 11 and 12 also result in an intermediate image lying on an intermediate image plane between the relay system and the objective lens 226, and which is tilted relative to the real object plane toward a plane orthogonal to the optical-fiber axis 800 and slightly offset along y relative to the real object 804.

It is noted that in order to obtain an appropriate contrast in the image of the optical-fiber endface 104 as produced by the optical-fiber inspection microscope probe 201, care should be taken to capture back a substantial proportion of the object beam 126 mainly produced by specular reflection of illumination light on the endface 104. In order to do so, the optical system 227 may be configured such that the illumination light reaches the optical fiber endface 104 at an orientation that is close the normal n to the endface. This is made possible by configuring the relay lens system 220 to redirect the illumination light, which is initially propagating along the imaging and illumination axis 814 of the optical-fiber inspection microscope probe 201, toward the normal n to the optical-fiber endface 104. This allows for the specular reflection on the optical-fiber endface 104 to be efficiently captured back by the relay lens system 220 and the objective lens 226.

Figure 13:
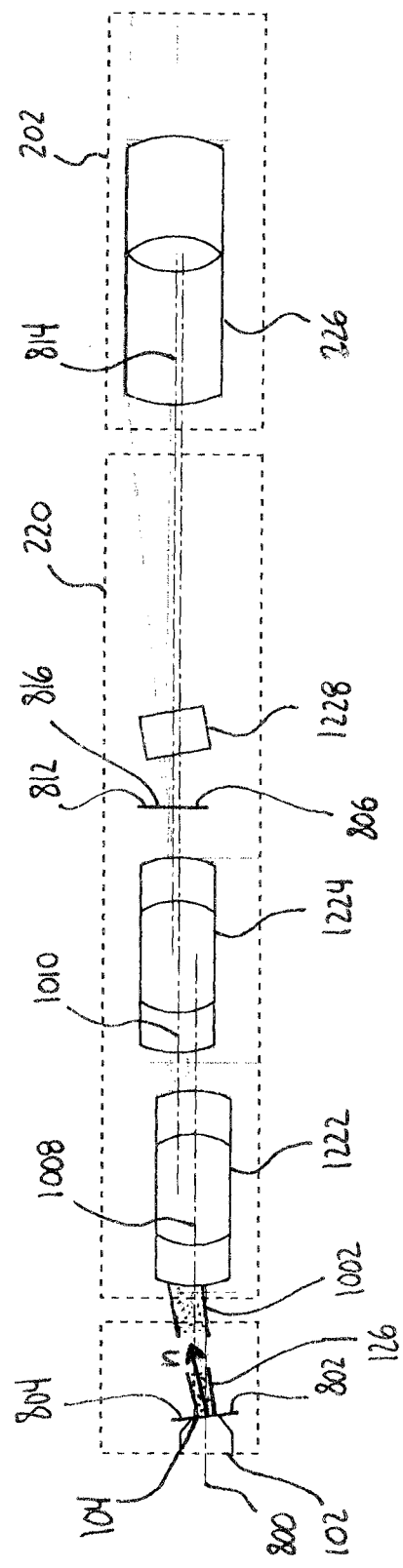
FIG. 13 is a schematic illustrating an optical configuration of an adapter tip in accordance with still another embodiment wherein the illumination beam aims at the optical-fiber connector endface with an orientation that is close to the normal to the endface.

FIG. 13 shows an optical configuration in accordance with another embodiment that is so optimized to capture a maximum proportion of the object beam 126. In this embodiment, the relay lens system 220 is configured so as to deviate the propagation of the illumination beam 1002 by an angle of 7.43° toward the normal n to the optical-fiber endface 104. The illumination beam 1002 thus aims on the optical-fiber endface 104 with an average propagation direction at an angle of 0.57° relative to the normal n, which allows capturing back a substantial proportion of the specular reflection on the endface 104 and thereby provides an excellent contrast on the captured image. Of course, other aiming angles are possible. In some embodiment, suitable contrast can be achieved with an aiming angle of the illumination beam relative to the normal n lying between −2° and 2°.

As shown in the FIG. 13, relay lens 1222 and relay lens 1224 of the optical configuration of FIG. 13 cooperate to together deviate the illumination beam 1002 toward the normal n to the optical-fiber endface 104 and to also deviate the object beam 126 towards the optical-fiber axis 800 of the connector 102 in order to be captured by the objective lens 226. The relay lens system 220 reproduces the real object 804 that lies in the real object plane 802 on an intermediate image plane 806 that is tilted relative to the real object plane 802 toward a plane orthogonal to the optical-fiber axis 800, so as to reduce the angle between the normal to the intermediate image plane 806 and the optical-fiber axis 800 of the connector 102. As in the optical configuration of FIG. 8, the lens axis 1008 of relay lens 1222 is slightly offset relative to the optical-fiber endface 104, toward the direction corresponding to the rejection y of the normal n to the optical-fiber endface 104 on the optical-fiber axis 800. The lens axis 1010 of relay lens 1224 is also slightly offset relative to the center of relay lens 1222 toward the same direction. There results an intermediate image 812 lying on an intermediate image plane 806 between relay lens 1224 and the objective lens 226, and which is tilted relative to the real object 804 toward a plane orthogonal to the optical-fiber axis 800 and slightly offset along y relative to the real object 804. The objective lens 226 is disposed such that the intermediate image plane 806 lies on the original object plane 816 of the optical-fiber inspection microscope probe 201 (without the adapter tip 200) to within its focusing range. As such, the lens axis 814 of the objective lens 226 is also slightly offset along y relative to the center of relay lens 1224.

As in the embodiment of FIG. 8, the optical axes 1008, 1010 of both relay lenses 1222, 1224 are parallel to the optical-fiber axis 800, and therefore not normal to the inspected endface. The offsets reduce the amount of light blocked by the inside walls 128 (see FIG. 1) of the connector adapter 100, rotates the intermediate image plane 806 relative to the real object plane 802 and also deviate the illumination beam 1002 toward the normal n to the optical-fiber endface 104.

Offsets of the optical axes 1008, 1010 of the relay lenses 1222, 1224, relative to the real object plane and to one another, may induce optical aberrations in the relay lens system 220, including coma and astigmatism. In order to correct these aberrations, the optical configuration of FIG. 13 further comprises correction optics 1228 embodied as an optical plate disposed at a non-zero angle relative to the lens axis 814 of the objective lens 226 (or, equivalently, relative to optical-fiber axis 800). In this embodiment, correction optics 1228 is disposed between the objective lens 226 and relay lens 1224 but other configurations may be envisaged. It is noted that, in other embodiments, correction optics 1228 may be embodied, e.g., by an optical wedge or any other optical device providing the required correction.

In one embodiment, relay lenses 1222 and 1224 are identical Hasting triplet lenses each having an effective focal length of 8.66 mm and a diameter of 3.74 mm. The distance between the real object plane 802 and relay lens 1222 is 6.94 mm, the distance between relay lenses 1222 and 1224 is 12.09 mm, and relay lens 1224 is positioned in the adapter tip 200 so as to be disposed at a distance of 33.82 mm to the objective lens 226 (the distances being defined along the imaging and illumination axis 814 of the optical-fiber inspection microscope probe 201 between the respective input surfaces of the lenses, i.e. the surface that is the closest to the object). The distance between the optical plate 1230 and relay lens 1224 is 15.47 mm (again defined between the input surfaces), the thickness of the optical plate 1228 is 2.2 mm and the angle between the optical plate 1228 and a plane orthogonal to the lens axis 814 of the objective lens 226 is 10.25°. The offset between the optical-fiber axis 800 and the lens axis 808 of relay lens 222 is 0.61 mm, the offset between the lens axis 808 of relay lens 222 and the lens axis 810 of relay lens 224 is 0.84 mm, and the offset between the lens axis 810 of relay lens 224 and the lens axis 814 of the objective lens 226 is 0.42 mm.

The optical configuration of FIG. 13 is otherwise similar to that of FIG. 8 and like features are not repeatedly described.

Figure 14:
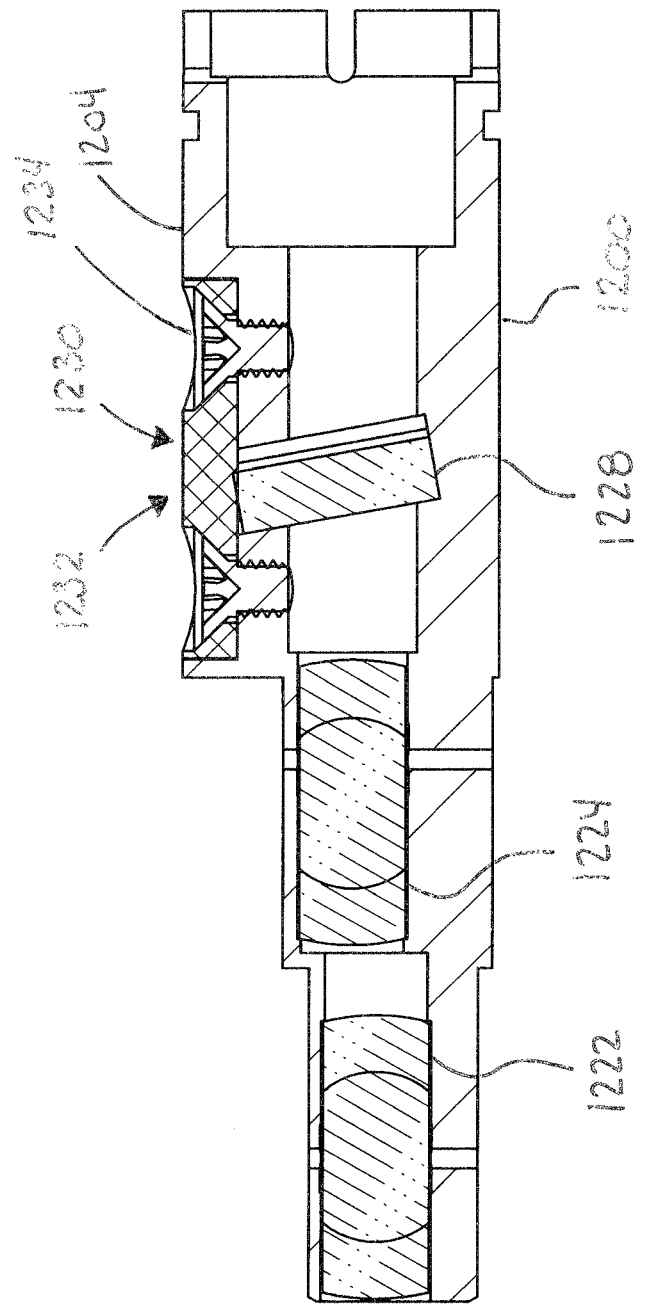
FIG. 14 is a cross-sectional view of the adapter tip corresponding to the optical configuration of FIG. 13.

FIG. 14 is a cross-sectional view of an adapter tip 1200 embodying the optical configuration of FIG. 13. The adapter tip 1200 is configured to receive relay lens 1222, relay lens 1224 and correction optics 1228 of the optical configuration of FIG. 13. In order to allow insertion of correction optics 1228 in the optical path, a small window 1230 is machined in the housing 1204 of the adapter tip 1200. Once the correction optics 1228 is properly inserted in the housing through the window 1230, a cover plate 1232 is placed to close that window 1230 and is held in place using screws 1234. The adapter tip 1200 is otherwise similar to the adapter tip 200 of FIGS. 2-7 and like features are therefore not repeatedly described.

It will be understood that various modifications may be envisaged to the embodiments described herein without departing from the scope of the invention. For example, although the embodiments described herein advantageously comprise an adapter tip that is releasably connectable to an optical-fiber inspection microscope probe, it is understood that the adapter tip could also be made integral to the inspection microscope probe so as to render it dedicated to inspection of certain types of optical-fiber connectors and adapters.

The embodiments described above are intended to be exemplary only. The scope of the invention is therefore intended to be limited solely by the appended claims.

What is claimed is:

1. An adapter tip to be employed with an optical-fiber inspection microscope probe for imaging an optical-fiber endface of an angled-polished optical-fiber connector recessed within a connector adapter, the adapter tip comprising:

a housing having a mating interface configured to mechanically engage with the connector adapter for inspecting the optical-fiber endface within the connector adapter; and a relay lens system disposed in said housing and having at least a first relay lens which is disposed so as to directly receive light reflected from said optical-fiber endface during inspection, the lens axis of said first relay lens being offset relative to a center of the optical-fiber endface toward a direction corresponding to the vector rejection of the normal to the optical-fiber endface on the optical-fiber axis of the connector so as to deviate light reflected from the optical-fiber endface towards the optical-fiber axis of the connector, wherein the lens axis of said first relay lens is offset relative to the center of the optical-fiber endface sufficiently so that the lens axis of said first relay lens does not intersect the optical-fiber endface.

2. The adapter tip as claimed in claim 1, wherein said relay lens system further comprises a second relay lens spaced apart from said first relay lens and cooperating with said first relay lens to deviate light reflected from the optical-fiber endface towards the optical-fiber axis of the connector.

3. The adapter tip as claimed in claim 2, wherein said relay lens system produces an intermediate image plane that is tilted relative to a real object plane on which lies the optical-fiber endface, towards a plane orthogonal to the optical-fiber axis of the connector.

4. The adapter tip as claimed in claim 3, wherein said intermediate image plane lies between said relay lens system and an objective lens of said optical-fiber inspection microscope probe.

5. The adapter tip as claimed in claim 2, wherein a center of an input surface of said second relay lens is offset relative to the lens axis of said first relay lens.

6. The adapter tip as claimed in claim 5, wherein the lens axis of said first relay lens and the lens axis of said second relay lens are both parallel to said optical-fiber axis.

7. The adapter tip as claimed in claim 6, wherein said optical-fiber inspection microscope probe comprises an objective lens and wherein the lens axis of said objective lens is parallel to said optical-fiber axis.

8. The adapter tip as claimed in claim 1, wherein said adapter tip receives illumination light from the optical-fiber inspection microscope probe during inspection in order to image the optical-fiber endface and wherein said relay lens system redirects the illumination light substantially normal to the optical-fiber endface.

9. The adapter tip as claimed in claim 1, further comprising correction optics to correct for optical aberrations induced by said relay lens system and wherein said correction optics comprises an optical plate disposed at a non-zero angle relative to optical-fiber axis of the connector.

10. The adapter tip as claimed in claim 1, wherein said lens axis of said first relay lens is parallel to said optical-fiber axis.

11. An optical-fiber inspection microscope system for imaging an optical-fiber endface of an angled-polished optical-fiber connector recessed in a channel, the microscope system comprising:
an optical-fiber inspection microscope probe; and
an adapter tip connectable to the optical-fiber inspection microscope probe and comprising:
a housing having a mating interface configured to mechanically engage with the connector adapter for inspecting the optical-fiber endface within the connector adapter;
a relay lens system disposed in said housing and having at least a first relay lens which is disposed so as to directly receive light reflected from said optical-fiber endface during inspection, the lens axis of said first relay lens being offset relative to a center of the optical-fiber endface toward a direction corresponding to the vector rejection of the normal to the optical-fiber endface on the optical-fiber axis of the connector so as to deviate light reflected from the optical-fiber endface towards the optical-fiber axis of the connector, wherein the lens axis of said first relay lens is offset relative to the center of the optical-fiber endface sufficiently so that the lens axis of said first relay lens does not intersect the optical-fiber endface.

12. The optical-fiber inspection microscope system as claimed in claim 11, wherein said relay lens system further comprises a second relay lens spaced apart from said first relay lens and cooperating with said first relay lens to deviate light reflected from the optical-fiber endface towards the optical-fiber axis of the connector.

13. The adapter tip as claimed in claim 12, wherein said relay lens system produces an intermediate image plane that is tilted relative to a real object plane on which lies the optical-fiber endface, towards a plane orthogonal to the optical-fiber axis of the connector.

14. The optical-fiber inspection microscope system as claimed in claim 13, wherein said relay lens system produces said intermediate image plane lies between said second relay lens and an objective lens of said optical-fiber inspection microscope probe.

15. The optical-fiber inspection microscope system as claimed in claim 12, wherein a center of an input surface of said second relay lens is offset relative to the lens axis of said first relay lens.

16. The optical-fiber inspection microscope system as claimed in claim 15, wherein the lens axis of said first relay lens and the lens axis of said second relay lens are both parallel to said optical-fiber axis.

17. The optical-fiber inspection microscope system as claimed in claim 16, wherein said optical-fiber inspection microscope probe comprises an objective lens and wherein the lens axis of said objective lens is parallel to said optical-fiber axis.

18. The optical-fiber inspection microscope system as claimed in claim 11, wherein said adapter tip receives illumination light from the optical-fiber inspection microscope probe during inspection in order to image the optical-fiber endface and wherein said relay lens system redirects the illumination light substantially normal to the optical-fiber endface.

19. The optical-fiber inspection microscope system as claimed in claim 11, wherein said adapter tip further comprises correction optics to correct for optical aberrations induced by said relay lens system and wherein said correction optics comprises an optical plate disposed at a non-zero angle relative to the first relay lens.

20. The optical-fiber inspection microscope system as claimed in claim 11, wherein said lens axis of said first relay lens is parallel to said optical-fiber axis.

* * * * *